United States Patent
Kim et al.

(10) Patent No.: US 9,560,188 B2
(45) Date of Patent: Jan. 31, 2017

(54) ELECTRONIC DEVICE AND METHOD FOR DISPLAYING PHONE CALL CONTENT

(71) Applicant: Samsung Electronics Co., Ltd., Suwon-si, Gyeonggi-do (KR)

(72) Inventors: Hong Kim, Seoul (KR); Harkkyu Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/850,269

(22) Filed: Sep. 10, 2015

(65) Prior Publication Data

US 2016/0080558 A1 Mar. 17, 2016

(30) Foreign Application Priority Data

Sep. 15, 2014 (KR) .................. 10-2014-0121979

(51) Int. Cl.
*H04W 4/18* (2009.01)
*H04M 1/725* (2006.01)
*H04M 3/493* (2006.01)
*G10L 15/26* (2006.01)

(52) U.S. Cl.
CPC ..... *H04M 1/72591* (2013.01); *H04M 1/72522* (2013.01); *H04M 3/4936* (2013.01); *H04W 4/18* (2013.01); *G10L 15/26* (2013.01)

(58) Field of Classification Search
CPC ............ H04M 1/72591; H04M 3/4936; H04M 3/2281; H04M 3/2218; G10L 15/26; G06Q 40/08; G06Q 50/22; H04W 4/16
USPC .......... 455/414.1; 705/4; 379/88.01; 370/352
See application file for complete search history.

(56) References Cited

U.S. PATENT DOCUMENTS

2014/0179283 A1* 6/2014 Kwon .................. H04W 4/16
455/414.1

FOREIGN PATENT DOCUMENTS

| JP | 2003-288340 A | 10/2003 |
| KR | 10-2001-0069409 A | 7/2001 |
| KR | 10-0383053 B1 | 5/2003 |
| KR | 10-2005-0107561 A | 11/2005 |

* cited by examiner

*Primary Examiner* — Phuoc H Doan
(74) *Attorney, Agent, or Firm* — Jefferson IP Law, LLP

(57) ABSTRACT

An electronic device and method for displaying phone call content are provided. The electronic device includes a communication unit configured to transmit and receive voice data during a phone call connection, an audio unit configured to input and output voice data, an input unit configured to receive a user input, a controller configured to determine whether a connected phone call corresponds to an automatic response system (ARS) phone call, and convert received voice data into text data when the connected phone call corresponds to the ARS phone call, and a display unit configured to display the converted text data.

16 Claims, 7 Drawing Sheets

ELECTRONIC DEVICE AND METHOD FOR
DISPLAYING PHONE CALL CONTENT

CROSS-REFERENCE TO RELATED
APPLICATION(S)

This application claims the benefit under 35 U.S.C. §119 (a) of a Korean patent application filed on Sep. 15, 2014 in the Korean Intellectual Property Office and assigned Serial number 10-2014-0121979, the entire disclosure of which is hereby incorporated by reference.

TECHNICAL FIELD

The present disclosure relates to an electronic device which can convert voice data, received during a phone call, into text data and then display the text data, and a phone call content display method.

BACKGROUND

Recently, an electronic device such as a portable mobile communication terminal has been developed to complexly perform various functions such as a voice and video phone call function, a function of transmitting a message or e-mail, a function of inputting or outputting information, a multimedia reproduction function, and a game function.

In order to provide complex functions, the electronic device often includes a display screen. However, the electronic device usually displays only a simple menu for an operation of a user, phone call counterpart information, or an icon on the display screen during a phone call connection. Therefore, during an automatic response system (ARS) call such as a voice guidance service of a specific phone number, in the case in which a user does not remember a voice guidance content or in the case of a user having diminished hearing, the user should repeatedly listen to the voice content or should receive the voice guidance service by making a call again.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method, when an automatic response system (ARS) voice guidance service is provided, an electronic device, which can converts a voice guidance content to a text and then display the text, and a phone call content display method.

In accordance with an aspect of the present disclosure, an electronic device is provided. The electronic device includes a communication unit configured to transmit and receive voice data during a phone call connection, an audio unit configured to and output voice data, an input unit configured to receive a user input, a controller configured to determine whether a connected phone call corresponds to an automatic response system (ARS) phone call and to convert received voice data into text data when the connected phone call corresponds to the ARS phone call, and a display unit configured to display the converted text data.

In accordance with another aspect of the present disclosure, a method of displaying a phone call conversation of an electronic device is provided. The method includes connecting a phone call, determining whether a connected phone call corresponds to an ARS phone call, converting received voice data into text data by analyzing the received voice data when the connected phone call corresponds to the ARS phone call, and displaying the converted text data.

According to an electronic device and a phone call content display method in various embodiments of the present disclosure, voice data received during a phone call can be converted into text data and then the text data can be displayed.

According to the electronic device and the phone call content display method in various embodiments of the present disclosure, it is possible to determine whether a connected phone call corresponds to an ARS phone call.

According to the electronic device and the phone call content display method in various embodiments of the present disclosure, the voice data is converted into the text data in the case of the ARS phone call so that an accuracy of the conversion of the text data can be improved.

According to the electronic device and the phone call content display method in various embodiments of the present disclosure, displayed text data can be displayed by configuring a language of the displayed text data to translate the displayed text data into a desired language.

According to the electronic device and the phone call content display method in various embodiments of the present disclosure, the ARS phone call is automatically and repeatedly progressed and after the ARS is terminated, it is possible to notify, to the user, that a phone call is connected to a counterpart.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some components may be exaggerated, omitted, or schematically illustrated, and a size of each component may not precisely reflect the actual size thereof. Thus, the present disclosure is not limited by the relative sizes of or distances between elements illustrated in the accompanying drawings.

Further, the term "unit", "module", etc. used in the present disclosure implies a unit for performing at least one function or operation, which can be implemented by hardware, software, or a combination of hardware and software.

Hereinafter, the present disclosure will be described with reference to the accompanying drawings.

Figure 1:
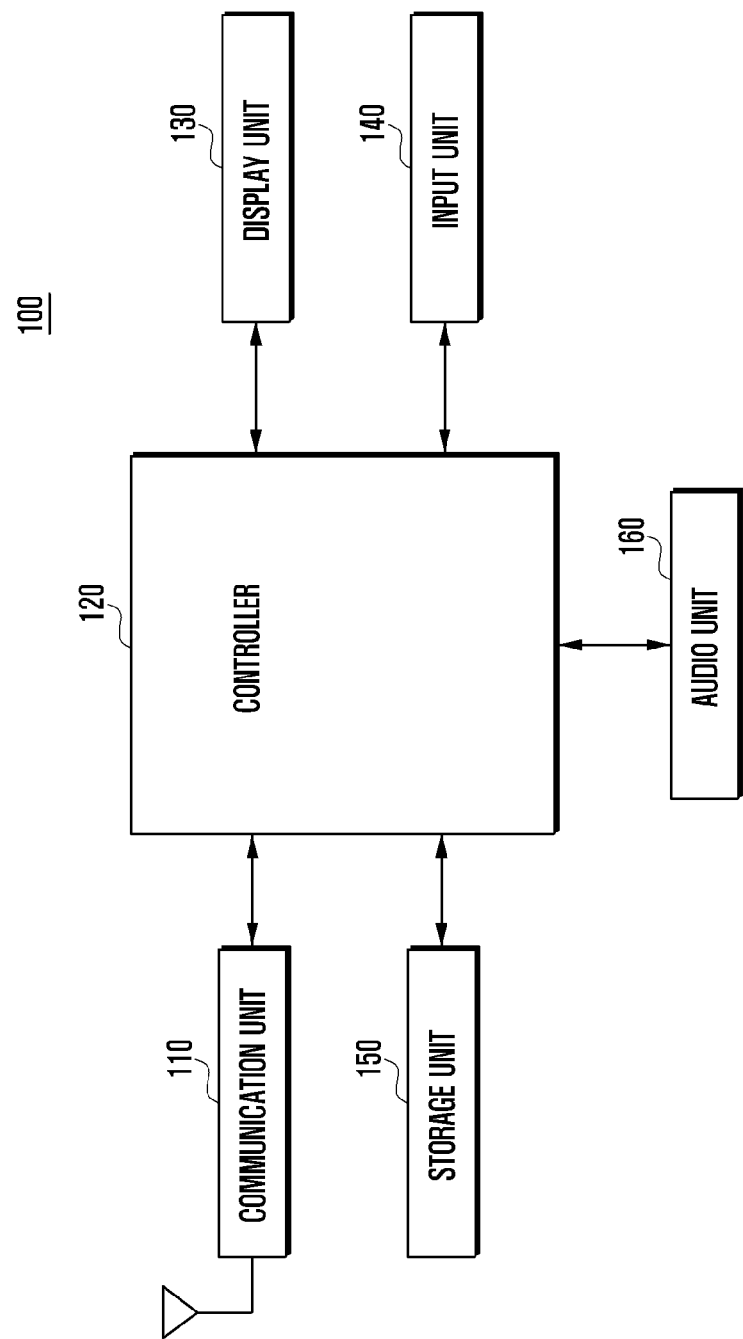
FIG. 1 is a block diagram illustrating an electronic device according to various embodiments of the present disclosure.

FIG. 1 is a block diagram illustrating an electronic device according to various embodiments of the present disclosure.

Referring to FIG. 1, the electronic device 100 may include a communication unit 110, a controller 120, a display unit 130, an input unit 140, a storage unit 150, and an audio unit 160.

The communication unit 110 supports a wireless communication function of the electronic device 100 and may be configured as a mobile communication module when the electronic device 100 supports the mobile communication function. The communication unit 110 may include a radio frequency (RF) transmitter for up-converting and amplifying a frequency of a transmitted radio signal and an RF receiver for low noise-amplifying a received radio signal and down-converting a frequency. Further, when the electronic device 100 supports a wireless short-range communication function, such as Wi-Fi communication, BLUETOOTH™ communication, ZIGBEE™ communication, ultra wideband (UWB) communication, and near field communication (NFC), the communication unit 110 may include a Wi-Fi communication module, a BLUETOOTH communication module, a ZIGBEE communication module, a UWB communication module, and an NFC communication module.

According to various embodiments of the present disclosure, the communication unit 110 may transmit and receive voice data through a mobile communication network, Internet, or a network. The communication unit 110 may transmit the received voice data to the controller 120 or the audio unit 160.

The controller 120 may drive an operating system or an application program to control a plurality of hardware or software elements connected to the controller 120, and may perform processing and operation of various data including multimedia data. The controller 120 may be implemented by, for example, a system on chip (SoC). According to an embodiment of the present disclosure, the controller 120 may further include a graphic processing unit (GPU) (not shown).

According to various embodiments of the present disclosure, the controller 120 may determine whether a connected phone call corresponds to an automatic response system (ARS) phone call. The controller 120 may determine the connected phone call is the ARS phone call in a case in which a phone number of the connected phone call is included in a list of the pre-stored ARS phone numbers. The list of the ARS phone numbers may include information on phone numbers providing an ARS service. The controller 120 may determine whether a current connected phone number is included in the list of the ARS phone numbers by identifying the list of the stored ARS phone number during the phone call connection. For example, when a phone number, e.g., "1577-6114," corresponding to the ARS number is pre-stored in the list of the ARS phone numbers, the controller 120 may determine, in the case in which a phone call connected phone number is "1577-6114" that the phone call connected phone number is the ARS phone number. The controller 120 may make a control to receive and store the list of the ARS phone numbers from an external ARS server. Further, the controller 120 may determine whether the corresponding phone number corresponds to the ARS phone number in real time from the external ARS server during the phone call connection.

The controller 120 may analyze received voice data and then determine the phone call connected phone number as the ARS phone number when the received voice data corresponds to a mechanical sound. For example, in a case of the ARS phone call, a voice guidance may be provided with the mechanical sound. The mechanical sound may have a constant tone, intonation, or pronunciation. The controller 120 may determine that the connected phone call corresponds to the ARS phone call when it is determined that the voice data is the mechanical sound by analyzing the tone, intonation, or pronunciation of received voice data. According to an embodiment of the present disclosure, when the connected ARS phone number is not included in the list of the pre-stored ARS numbers, the controller 120 may add a newly determined ARS phone number to the list of the ARS phone numbers and then store the added ARS phone number.

According to an embodiment of the present disclosure, when the electronic device requests a phone call connection, the controller 120 may determine the phone call as the ARS phone call in a case in which a time interval until a counterpart responds to a phone call and connects the phone call, after the phone call connection request, is less than or equal to a configured time interval. For example, an ARS system may automatically respond to a phone call without a user's decision and may thus have a short time interval up to the automatic response to the phone call. Therefore, when the electronic device 100 makes a phone call with a specific phone number, the controller 120 may determine the phone call is the ARS phone call in a case of accepting a phone call connection by the counterpart within the pre-configured time interval. For example, when the electronic device 100 performs a phone call connection on a 3rd generation partnership project (3GPP) standard, the controller 120 may determine that a connected phone call corresponds to the ARS phone call if a time interval until PROCEEDING~CONNECT ACK, which is a phone call control message of a non access stratum (NAS) layer in the 3GPP standard, is less than 2 seconds.

When the connected phone call corresponds to the ARS phone call, the controller 120 may convert received voice data into text data. According to an embodiment of the present disclosure, the controller 120 may transmit the received voice data to an external server which can convert the voice data into the text data by controlling the communication unit 110. The controller 120 may control to receive the converted text data from the external server through the communication unit 110 and then display the received text data.

The controller 120 may determine an analysis language required to analyze the voice data. The analysis language may correspond to a language representing the language the controller 120 uses to analyze the voice data. For example, the controller 120 may have previously determined to which language the voice data corresponds so that the voice data can quickly and easily be analyzed. The controller 120 may determine an analysis language based on a counterpart's phone number during the connected phone call. For example, in a case of a phone number, a phone number used in a specific country or region may be designated separately. The controller 120 may determine that the phone number corresponds to the phone number of a specific country using the counterpart's phone number during the connected phone call and determine a language of a corresponding country as the analysis language. For example, a phone number of a responding phone call may include a country code. The country code, such as "82" for Korea, "81" for Japan, or "1" for the United States of America, may be included in the phone number. The controller 120 may determine a language corresponding to a country code included in the phone number of the responding phone call as the analysis language.

According to an embodiment of the present disclosure, the controller 120 may determine the language of the country of the corresponding country code based on a counterpart's phone number of a phone call from a caller as the analysis language. For example, when the electronic device 100 makes a phone call to a counterpart's terminal using a phone number of Italy or using a network from Italy, the controller 120 may determine Italian to be the analysis language.

The controller 120 may determine the analysis language based on a public land mobile network (PLMN) identifier (ID) being used. The PLMN ID may include a mobile country code (MCC) and a mobile network code (MNC) as an identification number of a network provider. That is, the PLMN ID may include specific country information and network provider information. The controller 120 may determine, as the analysis language, a language of a country of a provider of a network, to which the user has subscribed and is using, according to the provider and the country of the provider. For example, when a phone call is connected through a Korean network provider, the controller 120 may configure Korean as the analysis language. When the user is in a different overseas country (e.g., the U.S.A or Japan), the controller 120 may configure a language (e.g., English or Japanese) of a corresponding country as the analysis language according to information on a corresponding network provider. In a case of an ARS phone call which responds in a specific country, since a possibility of receiving voice data which corresponds to a language of a corresponding country increases, the controller 120 may configure the language of the corresponding country as the analysis language based on the PLMN ID.

According to an embodiment of the present disclosure, the controller 120 may configure or change the specific language as the analysis language depending on a user's input value.

The controller 120 may divide and store the received voice data with reference to a verbal pause. For example, when consecutive voice data is received, the controller 120 may divide and store an interval of the voice data for each case (i.e., a case in which the voice data is not received) in which the verbal pause occurs over a regular time interval. The controller 120 may divide an interval and then convert voice data for each interval into text data in order to display the text data in real time by rapidly converting the voice data. The controller 120 may convert each piece of stored voice data into the text data based on the analysis language.

The controller 120 may determine a display language required to display the text data. The controller 120 may determine the display language based on pre-stored home PLMN (HPLMN) information. The HPLMN information may be previously stored in the storage unit 150 and may be previously stored in a subscriber identity module (SIM) card of the electronic device 100. The controller 120 may configure a language corresponding to country information (e.g., the country code) included in the pre-stored HPLMN information as the display language. For example, even when a user of Korean responds to an ARS phone call in a foreign country, the controller 120 may configure Korean as the display language based on the HPLMN information.

According to an embodiment of the present disclosure, the controller 120 may configure or change a specific language as the display language depending on a user's input value. For example, the controller 120 may configure a language being used as a basic language in the electronic device 100 as the display language.

The controller 120 may translate the converted text data into the display language. For example, when the analysis language and the display language are different, the controller 120 may translate text data converted based on the analysis language into the display language. The controller 120 may translate the text data into the display language through a separate translation program or a translation algorithm.

According to various embodiments of the present disclosure, even when a language of a phone call is not a user's native language, text data may be displayed in a display language which the user has configured, thereby increasing the user's convenience.

According to various embodiments of the present disclosure, the controller 120 may detect a specific word or number from the converted text data. For example, the controller 120 may detect a specific keyword from the text data. In this event, information on a specific keyword to be detected may be pre-stored in the storage unit 150. The controller 120 may detect a number from the text data.

The controller 120 may configure a display screen based on a specific word or number which is detected from the text data. For example, when voice data such as "Please, press 1 for charge inquiry and press 2 to listen again" is received and then the received voice data is converted in to text data, the controller 120 may detect "1" and "2" from the text data. The controller 120 may configure a display screen including text data such as "1. Charge inquiry" and "2. Listen again" based on the detected number. That is, the controller 120 may divide text data for each portion in which a specific word is detected from the text data and then configure the display screen. The controller 120 may configure a display screen on which the divided text data is arranged in another line or another area. The controller 120 may control a display screen configured during a phone call to be displayed by the display unit 130.

According to various embodiments of the present disclosure, the controller 120 may measure a time interval up to a reception of a user input while an ARS voice is received. For example, the controller 120 may start a phone call and measure a time interval, together, thereby measuring the time interval up to a reception of the user input. When the user input is received many times during a phone call, the controller 120 may repeatedly measure a time up to a reception of a user input. When receiving a user input, the controller 120 may store a value of the received user input. For example, when the user input is received after 2 minutes from the phone call connection and the user input is received again after 1 minute, the controller 120 may store each time interval (2 minutes and 1 minute) and each value of the user input.

The controller 120 may determine whether a phone call connection with a counterpart succeeds after the ARS phone call is terminated, by analyzing the received voice data. Herein, the counterpart refers to not an ARS guidance voice but a user of a phone call counterpart. For example, the controller 120 may determine whether a phone call connection with a counselor succeeds after the ARS guidance. For example, if voice data such as "Please call back later" is received, when the sentence itself is recognized or a specific keyword or phrase (e.g., such as "later", "call back", "retry") included in the voice data is detected, the controller 120 may determine that the phone call connection with the counterpart fails. Further, when the mechanical sound is converted into a sound which is not the mechanical sound, the controller 120 may analyze the voice data and determine that the phone call connection with the counterpart succeeds after the ARS phone call is terminated.

When determining that the phone call connection with the counterpart fails after the ARS phone call is terminated, the controller 120 may re-connect the phone call with the ARS phone number which has been previously connected at a regular time interval. The regular time interval may correspond to a value preconfigured by the user. For example, the controller 120 may terminate the phone call when the phone call connection with the counterpart (e.g., counselor) fails after the ARS phone call is terminated. Then, the controller 120 may attempt a phone call to the same phone number at a preconfigured time interval. The controller 120 may re-input a user input stored according to a previously measured time interval after the phone call is connected. The controller 120 may re-input an identical value of a user input at an identical time interval after the ARS phone call is made, thereby repeatedly progressing through a previous procedure again. For example, when a user input value of "2134#" had been input after 2 minutes from the phone call connection in order to enter a desired selection while the ARS phone call is connected, the controller 120 may re-input the identical value of "2134#" after 2 minutes from the start of communication through reconnection to the same phone number after the phone call is terminated. Therefore, the controller 120 may automatically perform an ARS guidance service procedure which has previously repeated. In this event, the number of times in which the controller re-attempts the phone call after the phone call is terminated may be configured and changed according to the user input. Then, the controller 120 can notify of this to the user when the phone call with a counterpart (e.g., an ARS counselor) is connected.

Therefore, according to various embodiments of the present disclosure, the electronic device 100 may automatically progress a repetitive ARS service procedure so that the user can attempt a phone call connection with the counterpart without directly and repeatedly performing the ARS service procedure.

The display unit 130 may display various screens (e.g., a media content reproduction screen, a screen for an outgoing call, a messenger screen, a game screen, and a gallery screen) according to operations of the electronic device 100 of the user.

The display unit 130 may display (output) information processed by the user device. For example, when the user device is in a call mode, the display unit 131 may display a phone call related user interface (UI) or graphical UI (GUI). Further, the display unit 130 may display a video call mode, a photographed or/and received image, or a UI or GUI. The display unit 130 may support a screen display in a landscape or portrait mode depending on an orientation of the user device (or a direction in which the user device is placed) and a screen switching display according to an orientation change between the landscape and portrait modes.

The display unit 130 may include at least one of a liquid crystal display (LCD), a thin film transistor-LCD (TFT-LCD), a light emitting diode (LED), an organic LED (OLED), an active matrix OLED (AMOLED), a flexible display, a bended display, and a 3D display. Some displays among these may be implemented by a transparent display configured in a transparent type or a light transparent type so as to enable an exterior to be viewed.

According to an embodiment of the present disclosure, the display unit 130 may display a message or an icon which notifies the user that the ARS is terminated, or that a phone call that is connected with a counterpart during the ARS phone call is terminated, or during a phone call connection with the counterpart.

The input unit 140 may receive an input for an operation of the electronic device 100 from the user. The input unit 140 may receive a touch input from the user. The input unit 140 may include a touch panel. The touch panel may recognize a touch input based on at least one scheme among, for example, a capacitive scheme, a resistive scheme, an infrared scheme, and an ultrasonic scheme. Further, the touch panel may further include a control circuit. In the case of the capacitive type, physical contact or proximity recognition is possible. The touch panel may further include a tactile layer. The touch panel may provide a tactile response to the user. The input unit 140 may transmit an input signal according to the received touch input to the controller 120.

The input unit 140 may include a (digital) pen sensor, a key or an ultrasonic input device. The (digital) pen sensor may be implemented, for example, using the same or similar method to receiving a user's touch input or using a separate recognition sheet. The key may include, for example, a physical button, an optical key or a keypad. The ultrasonic input device may correspond to an apparatus, which can detect a micro acoustic wave in the electronic device 100 through an input tool which generates an ultrasonic signal so that data can be identified, and can perform a wireless recognition.

According to various embodiments of the present disclosure, the display unit 130 and the input unit 140 may be integrally configured. For example, the electronic device 100 may include a touch screen. The touch screen may simultaneously perform an input function and a display function. The touch screen may be formed in a structure in which a touch panel and a display panel are laminated. The touch screen may include an input/output means. The touch screen may detect a user's touch event input (e.g., a touch based long press input, a touch based short press input, a single-touch based input, a multi-touch based input, a touch based gesture (e.g., a drag input)) which contacts a surface. The touch screen may detect, when a user's touch event is detected on a touch screen surface, coordinates on which the touch event is generated and transfer the detected coordinates to the controller 120.

The touch screen may be configured to convert a change such as a pressure applied to a specific portion of a surface or a capacitance generated at the specific portion into an electrical input signal. The touch screen may be configured to detect not only a location and an area which is touched but also a pressure when a touch is performed according to an applied touch scheme. When there is a touch input for the touch screen, a signal corresponding thereto may be transferred to a touch controller (not shown). The touch controller may process the signal, and then transfer corresponding data to the controller 120.

According to various embodiments of the present disclosure, the input unit 140 may receive a user input for connecting a phone call, responding a phone call, terminating a phone call, interrupting a transmission sound, executing a call content display function, and inputting a dial. The input unit 140 may transmit the received user input to the controller 120.

The storage unit 150 may include image data, voice data, data input from the camera unit, data for processing a calculation, an algorithm required for an operation of the electronic device 100, configuration data, and guide information, and also temporarily store a processing result. The storage unit 150 may include a volatile memory or a non-volatile memory. For example, the volatile memory may include a static random access memory (SRAM) or a dynamic RAM (DRAM), and the non-volatile memory may include a read only memory (ROM), a flash memory, a hard disk, a secure digital (SD) memory card, and a multi-media card (MMC).

According to an embodiment of the present disclosure, the storage unit 150 may store voice data received from the user. The storage unit 150 may store voice data received through the communication unit 110. The storage unit 150 may store information on a time interval by which the user input is received during a phone call and a time interval between the user inputs in a case in which a plurality of user inputs have been received. The storage unit 150 may store the user input received during the phone call. The storage unit 150 may store the list of the ARS phone numbers including phone numbers providing the ARS voice guidance.

The audio unit 160 may bilaterally convert a voice and an electrical signal. The audio unit 160 may convert voice data input or output by including, for example, at least one among a speaker, a receiver, an earphone, and a microphone.

According to an embodiment of the present disclosure, the audio unit 160 may output the voice data (e.g., the ARS guidance voice) received during the phone call. The audio unit 160 may transmit voice data input by the user to the controller 120 or the storage unit 150.

According to an embodiment of the present disclosure, during the ARS phone call is terminated or during a phone call connection with the counterpart, the audio unit 160 may output an alarm sound which notifies the user that the ARS is terminated or that a phone call is connected with a counterpart.

Figure 2:
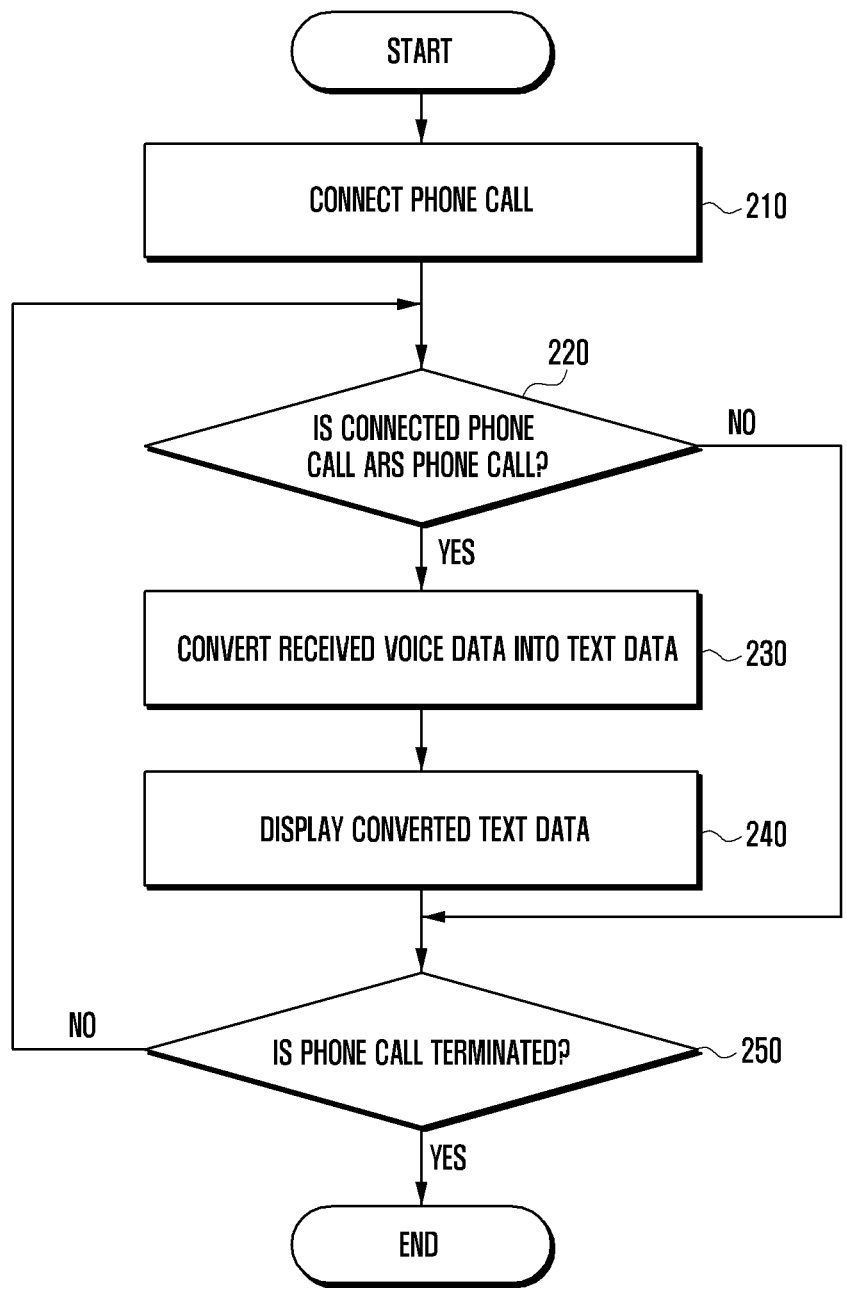
FIG. 2 is a flowchart illustrating a phone call content display method of an electronic device according to various embodiments of the present disclosure.

FIG. 2 is a flowchart illustrating a phone call content display method of an electronic device according to various embodiments of the present disclosure.

Referring to FIG. 2, in operation 210, an electronic device 100 may connect a phone call. The electronic device 100 may request a phone call to a counterpart or respond to the phone call from the counterpart according to a user input.

In operation 220, the electronic device 100 may determine whether a connected phone call corresponds to an ARS phone call. The controller 100 may determine that the connected phone call is the ARS phone call in a case in which a phone number of the connected phone call is included in a list of pre-stored ARS phone numbers. The list of the ARS phone numbers may include information of phone numbers providing an ARS service. The electronic device 100 may receive the list of the ARS phone numbers from an external ARS server to store the list of the ARS phone numbers. The electronic device 100 may determine from the external ARS server, in real time during a call connection, whether a corresponding phone number corresponds to the ARS phone number.

According to an embodiment of the present disclosure, the electronic device 100 may determine that the connected phone call corresponds to the ARS phone call when it is determined that the voice data is the mechanical sound by analyzing a tone, intonation, or pronunciation of received voice data.

According to an embodiment of the present disclosure, when the connected ARS phone number is not included in the list of the pre-stored ARS numbers, the electronic device 100 may add a newly determined ARS phone number to the list of the ARS phone numbers and then store the added ARS phone number.

According to an embodiment of the present disclosure, in operation 220, when the electronic device 100 requests a phone call connection, the electronic device 100 may determine the phone call is the ARS phone call in a case in which a time interval until a counterpart responds to a phone call and connects the phone call, after the phone call connection request, is less than or equal to a pre-configured time interval. For example, if a phone call to a specific phone number is requested, when the phone call is connected by accepting a phone connection within a pre-configured time interval (e.g., 2 seconds) by the counterpart, the electronic device 100 may determine the phone call as the ARS phone call. In this event, the electronic device 100 may add the specific phone number (a counterpart's phone number) to the list of the ARS phone numbers and then store the added specific phone number.

The electronic device 100 may perform operation 230 when a connected phone call corresponds to the ARS phone call. The electronic device 100 may perform operation 250 when the connected phone call does not correspond to the ARS phone call.

In operation 230, the electronic device 100 may convert received voice data into text data. The electronic device 100 may store the received voice data. The electronic device 100 may convert the received voice data into the text data in real time.

In operation 240, the electronic device 100 may display the converted text data. The electronic device 100 may display the text data, and may re-configure the display screen as a specific display screen including the text data and then display the reconfigured display screen.

In operation 250, an electronic device 100 may determine whether a phone call is terminated. The electronic device 100 may perform operation 220, again, when the phone call is not terminated.

Figure 3:
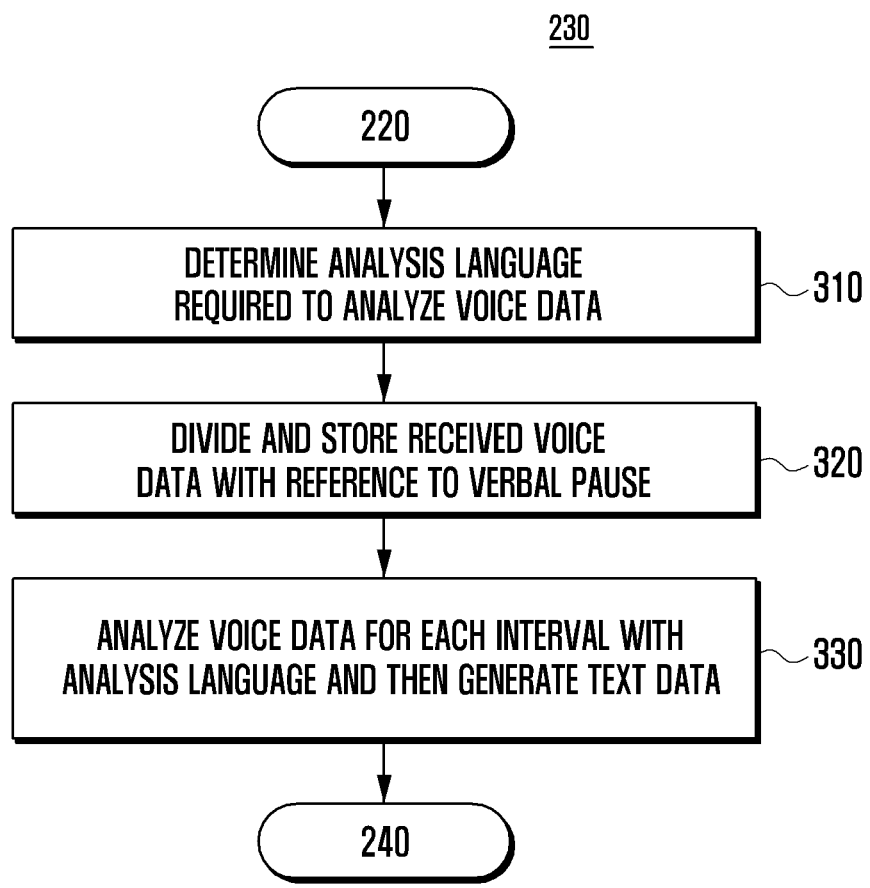
FIG. 3 is a flowchart illustrating an example of an operation of converting voice data into text data in a phone call content display method of an electronic device according to various embodiments of the present disclosure.

FIG. 3 is a flowchart illustrating an example of an operation of converting voice data into text data in a phone call content display method of an electronic device according to various embodiments of the present disclosure.

Referring to FIG. 3, an electronic device 100 may determine an analysis language required to analyze the voice data in operation 310. The analysis language may correspond to a configuration value representing which language is used to analyze the voice data.

According to an embodiment of the present disclosure, the electronic device 100 may determine the analysis language based on a counterpart's phone number during the connected phone call. The electronic device 100 may determine that a connected phone call corresponds to a number of a specific country using a counterpart's phone number and determine a language of a corresponding country as the analysis language. For example, the electronic device 100 may determine a language corresponding to a country code included in the phone number of the responding phone call as the analysis language.

According to an embodiment of the present disclosure, the electronic device 100 may determine the analysis language based on a PLMN ID being used. The PLMN ID may include an MCC and an MNC as an identification number of a network provider. The electronic device 100 may determine, as the analysis language, a language of a country of a provider of a network, to which the user has subscribed and is using, according to the provider and the country of the provider.

According to an embodiment of the present disclosure, the controller 120 may configure or change the specific language as the analysis language depending on a user's input value.

In operation 320, the electronic device 100 may divide and store the received voice data with reference to a verbal pause. For example, when consecutive voice data is received, the electronic device 100 may divide and store an interval of the voice data for each case (i.e., a case in which the voice data is not received) in which the verbal pause occurs over a regular time interval. The electronic device 100 may divide an interval and then convert voice data for each interval into text data, in order to display the text data in real time by converting the voice data.

In operation 330, the electronic device 100 may analyze the voice data for each interval with the analysis language, thereby generating the text data.

Figure 4:
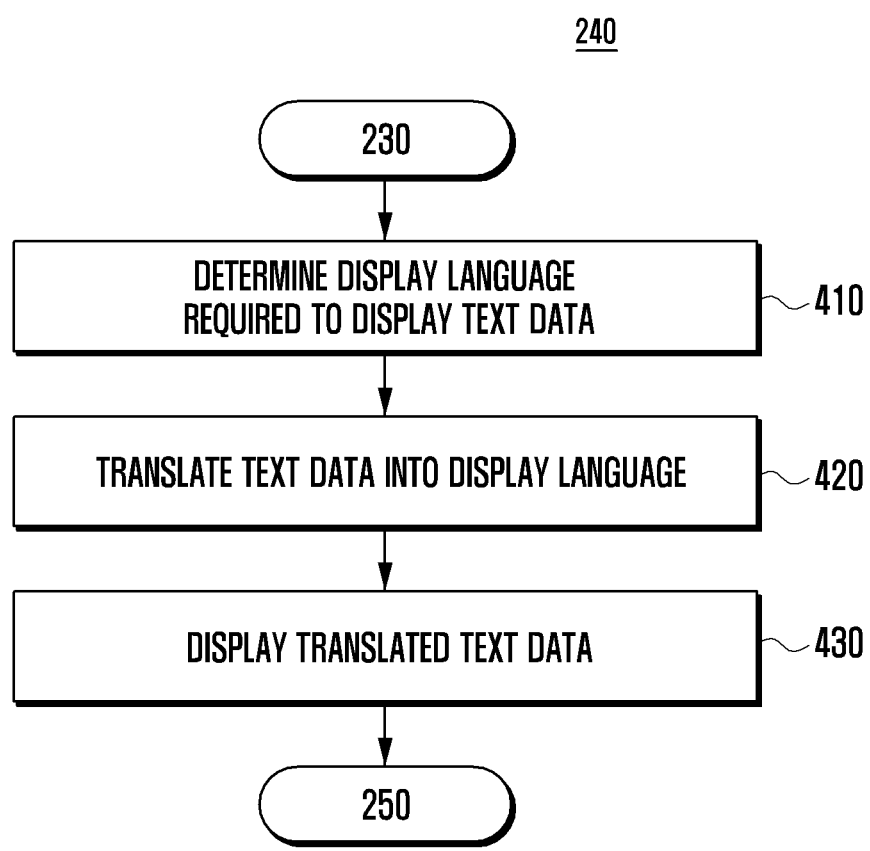
FIG. 4 is a flowchart illustrating an example of an operation of displaying text data in a phone call content display method of an electronic device according to various embodiments of the present disclosure.

FIG. 4 is a flowchart illustrating an example of an operation of displaying text data in a phone call content display method of an electronic device according to various embodiments of the present disclosure.

Referring to FIG. 4, an electronic device 100 may determine a display language required to display text data in operation 410. The electronic device 100 may determine the display language based on pre-stored HPLMN information. The HPLMN information may be pre-stored in the electronic device 100. The electronic device 100 may configure a language corresponding to country information (e.g., a country code) included in the pre-stored HPLMN information as the display language.

According to an embodiment of the present disclosure, the electronic device 100 may configure or change a specific language as the display language depending on a user's input value. The electronic device 100 may configure a language being used as a basic language in the electronic device 100 as the display language.

The electronic device 100 may translate the text data into the display language in operation 420. When the analysis language and the display language are different, the electronic device 100 may translate the text data converted based on the analysis language into the display language. The electronic device 100 may translate the text data into the display language through a separate translation program or a translation algorithm.

In operation 430, the electronic device 100 may display the translated text data. That is, the electronic device 100 may display voice data which is received during a phone call to text data in a language which the user wants.

Figure 5:
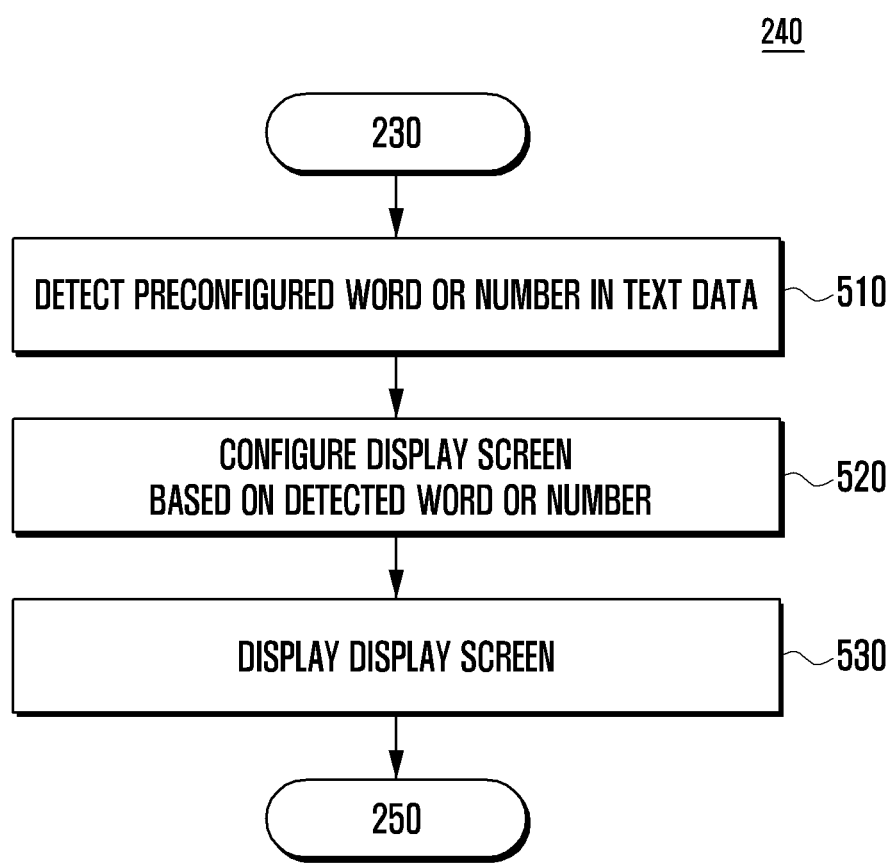
FIG. 5 is a flowchart illustrating another example of an operation of displaying text data in a phone call content display method of an electronic device according to various embodiments of the present disclosure.

FIG. 5 is a flowchart illustrating another example of an operation of displaying text data in a phone call content display method of an electronic device according to various embodiments of the present disclosure.

Referring to FIG. 5, in operation 510, the electronic device 100 may detect a pre-configured word or number in text data. The electronic device 100 may detect a specific keyword or phrase from the text data. The electronic device 100 may pre-store information on a specific keyword or phrase to be detected. The electronic device 100 may detect only a number (e.g., a number itself or a word referring to a number) separately from the text data.

In operation 520, the electronic device 100 may configure a display screen based on the detected word or number. The electronic device 100 may divide text data for each portion in which a specific word is detected from the text data and then configure the display screen. The electronic device 100 may configure a display screen on which each of pieces of the divided text data is arranged in another line or another area. The electronic device 100 may configure and correct the display screen during the phone call in real time. For example, the electronic device 100 may consecutively analyze text data being generated by converting the voice data in real time. Therefore, the electronic device 100 can correct the display screen so as to sequentially display text data related to voice data in real time on the display screen.

In operation 530, the electronic device 100 may display the display screen during the phone call. The display screen may be changed in real time by receiving the voice data. For example, the electronic device 100 may sequentially add text data representing a content of the voice data received during the phone call to the display screen and then display the added text data.

Figure 6:
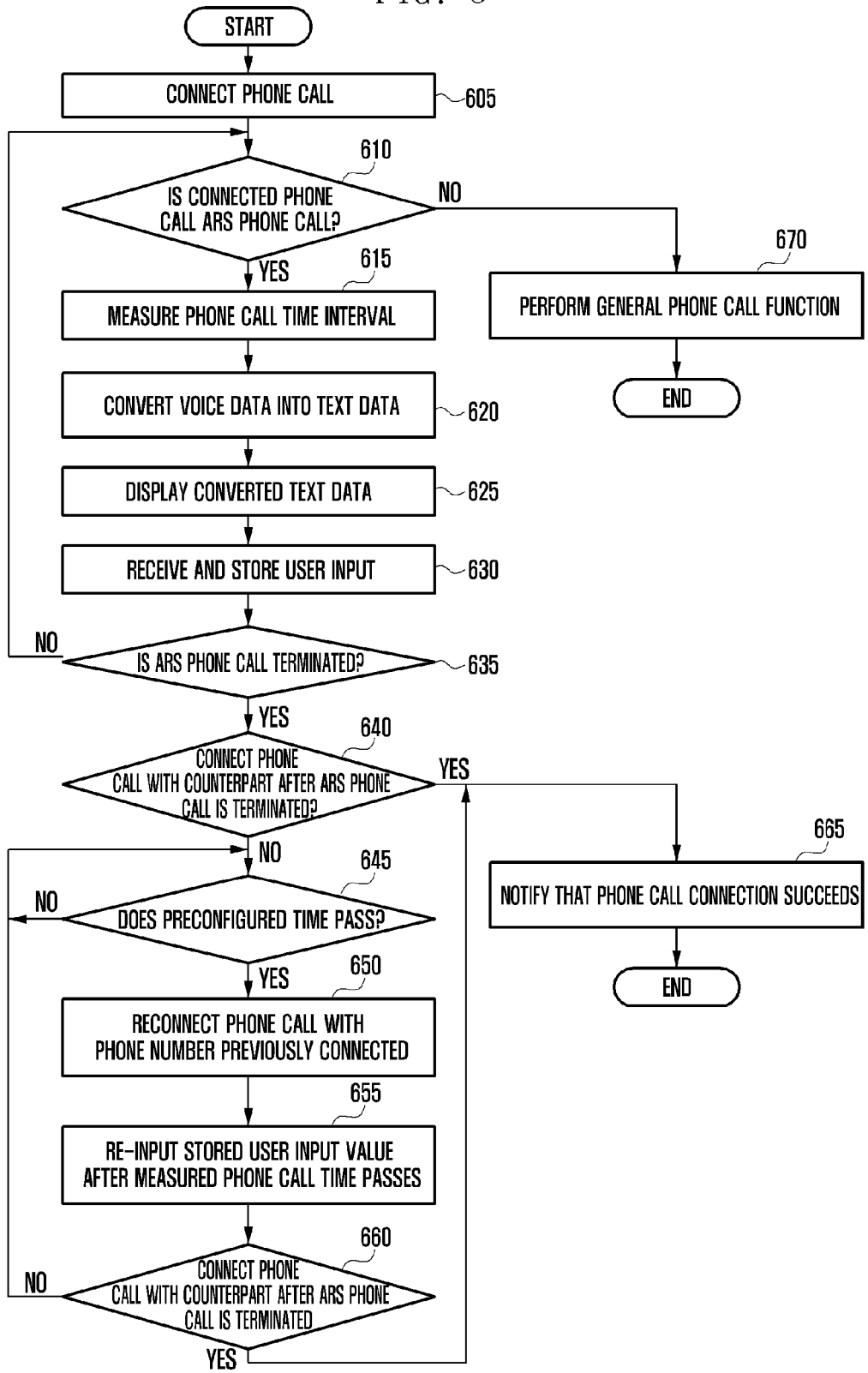
FIG. 6 is a flowchart illustrating a phone call content display method of an electronic device according to various embodiments of the present disclosure.

FIG. 6 is a flowchart illustrating a phone call content display method of an electronic device according to various embodiments of the present disclosure. Hereinafter, operations identical to the embodiment shown in FIG. 1 will briefly be described.

Referring to FIG. 6, in operation 605, an electronic device 100 may connect a phone call. In operation 610, the electronic device 100 may determine whether a connected phone call corresponds to an ARS phone call. When the connected phone call does not correspond to the ARS phone call, the electronic device 100 may perform operation 670 and then perform a general call function without displaying the phone call content.

When the connected phone call corresponds to the ARS phone call, operation 615 may be performed. The electronic device 100 may measure a phone call time interval when the connected phone call corresponds to the ARS phone call. The electronic device 100 may measure a phone call time interval from the phone call connection.

In operation 620, the electronic device 100 may convert voice data into text data. In operation 625, the electronic device 100 may display the converted text data.

In operation 630, the electronic device 100 may receive a user input. For example, the electronic device 100 may receive the user input corresponding to text data displayed by the electronic device 100. The electronic device 100 may store values of the received user input. When the user input is received, the electronic device 100 may measure and store the phone call time interval up to a reception of the user input. For example, when the electronic device 100 receives the user input after 2 minutes from the phone call connection, information that a value has been input of a specific user input after 2 minutes from the phone call connection may be stored together. When receiving the user input several times, the electronic device 100 may map and store time intervals from a phone call start to a reception of each user input and values of the user input. For example, after the ARS phone call is connected, the electronic device 100 may, from the user, receive a number "2" as the user input, receive a number "4" as the user input after 2 seconds, receive the number "4" as the user input after 3 seconds, and receive "*" as the user input after 12 seconds. In this event, the electronic device 100 may store a series of a sequence of a "2" input, 2 seconds waiting, a "4" input, 3 seconds waiting, a "4" input, 12 seconds waiting, and a "*" input.

In operation 635, the electronic device 100 may determine whether the ARS phone call is terminated. The electronic device 100 may perform operation 610 when the phone call is not terminated. The electronic device 100 may perform operation 640 when the phone call is terminated.

In operation 640, the electronic device 100 may determine whether a phone call with a counterpart succeeds after the ARS phone call is terminated. For example, the electronic device 100 may determine whether a phone call with the counterpart (e.g., a counselor of the ARS service) is connected after the ARS voice service guidance. That is, the electronic device 100 may determine whether a phone call is immediately terminated after the ARS service is terminated or whether the phone call with the counterpart is maintained. The electronic device 100 may perform operation 665 when the call connection with the counterpart succeeds after the ARS service is terminated. The electronic device 100 may perform operation 645 when the call connection with the counterpart fails after the ARS service is terminated.

According to an embodiment of the present disclosure, the electronic device 100 may terminate a phone call when the phone call with the counterpart fails. In operation 645, the electronic device 100 may determine whether a preconfigured time interval passes after the ARS phone call is terminated. The electronic device 100 may perform operation 650 when the preconfigured time interval passes. The preconfigured time interval may be a period for executing a phone call re-connection. For example, the electronic device 100 may be prepared a re-connection of a phone call every 5 minutes after the ARS phone call is terminated or the phone call is terminated.

According to an embodiment of the present disclosure, the electronic device 100 may reconfigure or change a time interval for re-connecting the phone call according to the user input. That is, the preconfigured time interval may be a preconfigured value or a value configured according to the user input, or changed by the user input.

In operation 650, an electronic device 100 may re-connect a phone call with a phone number which has previously been connected. For example, the electronic device 100 may connect a phone call with a phone number identical to the ARS phone call which has previously been connected.

In operation 655, the electronic device 100 may make a phone call with the ARS phone number which has previously been connected and then re-input a user input value stored in operation 630 after the phone call time interval measured in operation 615 passes. The electronic device 100 may automatically progress the ARS service procedures which had been directly input and progressed by the user during the ARS phone call. For example, when the electronic device 100 has received a user input of "2567#0" after two minutes from the phone call is connected during the previous phone call, the electronic device 100 may input the user input of "2567#0", which has been stored, after two minutes from the phone call connection. For example, when storing a series of a sequence in operation 630, the electronic device 100 may re-input an identical user input during the previous phone connection based on the stored sequence.

In operation 660, the electronic device 100 may determine whether a phone call with a counterpart succeeds after the ARS phone call is terminated. For example, the electronic device 100 may determine whether a phone call with the counterpart (e.g., a counselor of the ARS service) is connected after the ARS voice service guidance as shown in operation 640. According to an embodiment of the present disclosure, the electronic device 100 may terminate a phone call when the phone call with the counterpart fails.

According to an embodiment of the present disclosure, the electronic device 100 may determine whether a phone call is immediately terminated after the ARS service is terminated or whether the phone call with the counterpart is maintained. The electronic device 100 may repeatedly perform operation 645 the configured number of times when the phone call connection with the counterpart fails after the ARS service is terminated. That is, the electronic device 100 may repeat a phone call connection the preconfigured number of times when the phone call connection fails and then attempt the phone call connection.

In operation 665, the electronic device 100 may notify that the phone call connection with the counterpart succeeds to the user. For example, the electronic device 100 may display a message, an icon, and a window which represent that the phone call connection succeeds. The electronic device 100 may output a sound notifying that the phone call connection succeeds.

When the user wants to make a call with a counterpart (e.g., a counselor) after the ARS guidance, the user needs to repeatedly make a call with an identical phone number for each case in which the phone call connection fails. Further, the user needs to input identical information for the ARS service progressing procedures for each case in which the phone call is made.

According to various embodiments of the present disclosure, when the user wants to directly make a call with a counterpart following the ARS service, the electronic device 100 automatically performs a phone call connection and ARS service progressing procedures and then notifies of this when the phone call is directly connected with the counterpart. Therefore, the user may not perform unnecessary repetitive operations.

Figure 7:
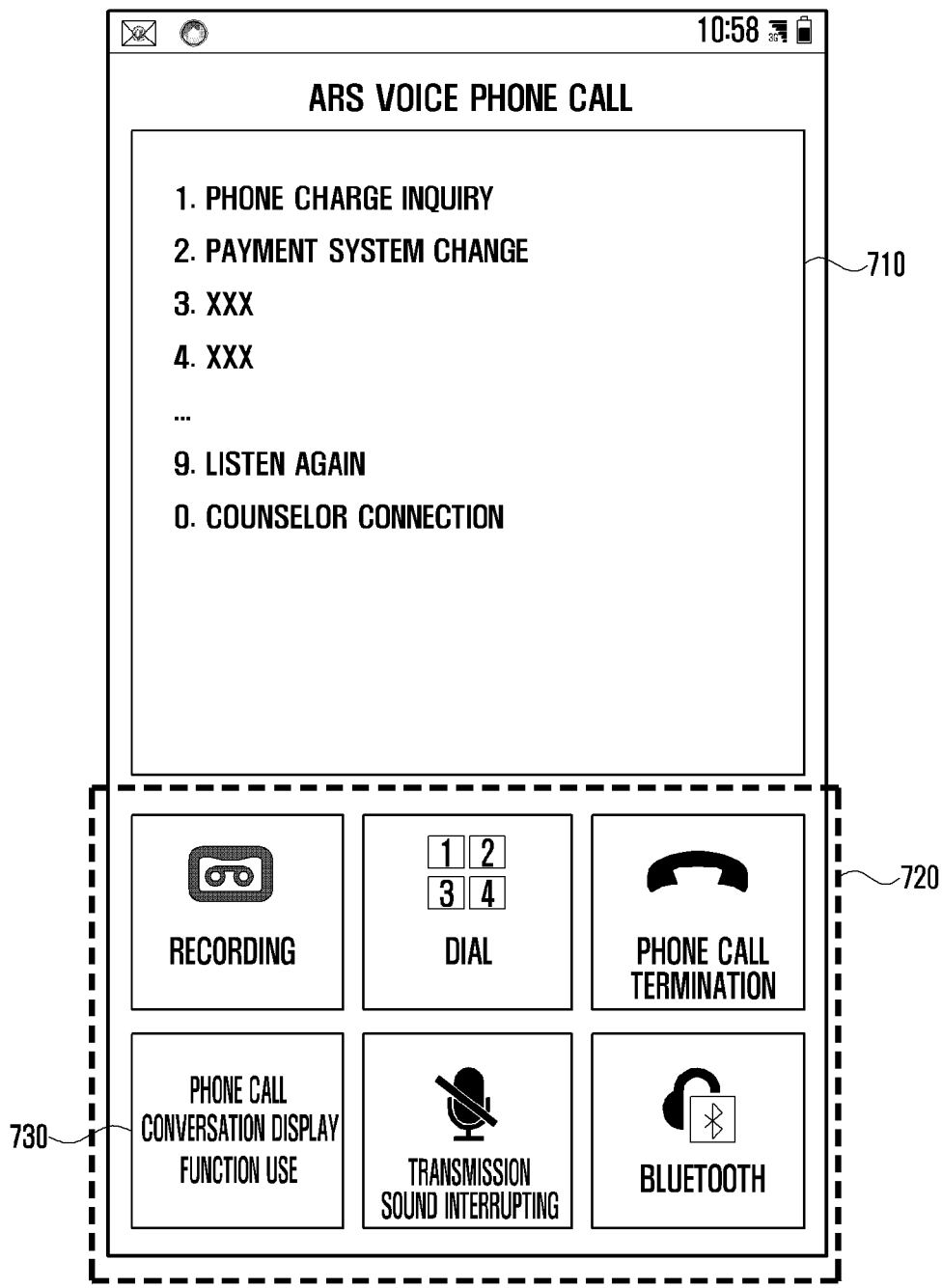
FIG. 7 illustrates an example of a screen, on which a content of voice data received during a phone call is converted into text data and then the text data is displayed, in a phone call content display method of an electronic device according to various embodiments of the present disclosure.

FIG. 7 illustrates an example of a screen, on which a content of voice data received during a phone call is converted into text data and then the text data is displayed, in a phone call content display method of an electronic device according to various embodiments of the present disclosure.

According to various embodiments of the present disclosure, the electronic device 100 may display a phone call screen in a display unit 130 during a phone call.

Referring to FIG. 7, the phone call screen may include an area 710 displaying text data and an area 720 for a user's operation during phone call. The area 710 displaying text data may include text data converted from received voice data. For example, a content of a voice guidance service may be displayed according to an ARS guidance voice. The electronic device 100 may extract a keyword in text data which is generated by analyzing the ARS guidance voice and then display only the keyword. For example, when there is an ARS guidance voice such as, "For a phone charge inquiry, please press 1," the electronic device 100 may convert the voice data to text data and display text data such as, "1. phone charge inquiry." A content of the text data shown in FIG. 6 may be changed according to the voice data received during the ARS phone call.

According to an embodiment of the present disclosure, the electronic device 100 may recognize specific text data representing a specific character in the text data. The electronic device 100 may recognize text data for specific characters (e.g., 1, 2, 3, 4, 5, 6, 7, 8, 9, 0, *, and #) used in a phone menu input. The electronic device 100 may configure text data to be displayed with reference to the recognized specific text data. The electronic device 100 may display a word including the specific text data first and then display text data generated before the specific text data behind the corresponding specific text data.

For example, when receiving voice data such as, "For a phone charge inquiry, please press 1, a payment system change, please press 2, . . . , To listen again, please press 9, and to speak to a counselor, please press 0," the electronic device 100 may configure and display text data such as, "1. phone charge inquiry, 2. payment system change, . . . , 9. listen again, and 0. counselor connection," as shown in FIG. 7.

For another example, when the electronic device 100 receives voice data such as, "For a use charge micropayment charge inquiry, please press 1, For a phone call quality and loss, please press 2, For an additional service charge system, please press 3, For membership roaming, please press 4, and For a counsel and reservation service, please press 8," sequentially input during the ARS phone call connection, the electronic device 100 may discriminately display the particular text data, for example, the converted text data, such as "1. use charge micropayment charge inquiry, 2. phone call quality and loss, 3. additional service charge system, 4. membership roaming, and 8. counsel and reservation service," in separate rows.

The area 720 for the user's operation during the phone call may include an icon, a button, or a key which can perform one or more specific functions. For example, the area for the operation during the phone call may include an icon for recoding a phone call, an icon for displaying a dial (e.g., a virtual key pad), a termination icon for terminating a phone call, an icon for interrupting a transmission sound, and an icon for performing a BLUETOOTH function. In particular, according to various embodiments of the present disclosure, the area 720 for the operation during the phone call may include an icon 730 for activating or deactivating a function of displaying the phone call content. The user may perform or terminate the function of displaying the phone call content of the electronic device 100 by touching the icon 730.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a transceiver configured to transmit and receive voice data during a phone call connection;
an audio interface configured to input and output voice data;
an input interface configured to receive a user input;
at least one processor configured to:
determine whether a connected phone call corresponds to an automatic response system (ARS) phone call,
convert received voice data into text data when the connected phone call corresponds to the ARS phone call, and
translate the converted text data into a display language, the display language determined based on pre-stored home public land mobile network (HPLMN) information; and
a display configured to display the translated text data.

2. The electronic device of claim 1, wherein the at least one processor is further configured to determine, when a phone number of the connected phone call is included in a list of ARS phone numbers, that the connected phone call corresponds to the ARS phone call.

3. The electronic device of claim 1, wherein the at least one processor is further configured to:
analyze the received voice data, and
determine that the connected phone call corresponds to the ARS phone call when the received voice data corresponds to a mechanical sound.

4. The electronic device of claim 1, wherein the at least one processor is further configured to determine, when the electronic device requests a phone call connection or when a time interval until a counterpart responds to a phone call and connects the phone call, after the phone call connection request, is less than or equal to a preconfigured time interval, that the connected phone call corresponds to the ARS phone call.

5. The electronic device of claim 1, wherein the at least one processor is further configured to:
determine an analysis language to analyze the voice data,
divide and store the received voice data with reference to a verbal pause, and
convert the stored voice data for each interval into text data by analyzing the voice data based on the analysis language.

6. The electronic device of claim 5, wherein the at least one processor is further configured to determine the analysis language based on a counterpart's phone number or a public land mobile network (PLMN) identifier (ID) of a network being used for the connected phone call.

7. The electronic device of claim 1, wherein the at least one processor is further configured to control to:
detect a preconfigured specific word or number in the text data, configure a display screen based on the detected specific word or number, and display the display screen.

8. The electronic device of claim 1, wherein the at least one processor is further configured to:

measure a time interval until a reception of a user input while an ARS voice is received, store the received user input, determine whether a phone call connection with the counterpart succeeds after the ARS phone call is terminated by analyzing the received voice data, re-input the stored user input according to the measured time interval by re-connecting a phone call with the ARS phone number which has been connected at a regular time interval when the phone call connection with the counterpart fails, and notify whether the phone call connection succeeds to the user when the phone call connection with the counterpart succeeds after the ARS phone call is terminated.

9. A method of displaying a phone call conversation of an electronic device, the method comprising:

connecting a phone call;

determining whether a connected phone call corresponds to an automatic response system (ARS) phone call;

converting received voice data into text data by analyzing the received voice data when the connected phone call corresponds to the ARS phone call;

translating the converted text data into a display language, the display language determined based on pre-stored home public land mobile network (HPLMN) information; and displaying the translated text data.

10. The method of claim 9, wherein the determining comprises determining whether a phone number of the connected phone call corresponds to the ARS phone call based on a list of pre-stored ARS phone numbers or information received from an ARS server.

11. The method of claim 9, wherein the determining comprises determining, when the electronic device requests a phone call connection or when a time interval until a counterpart responds to a phone call and connects the phone call, after the phone call connection request, is less than or equal to a preconfigured time interval, that the connected phone call corresponds to the ARS phone call.

12. The method of claim 9, wherein the determining comprises analyzing the received voice data, and when the received voice data corresponds to a mechanical sound, determining that the connected phone call corresponds to the ARS phone call.

13. The method of claim 9, wherein the converting comprises:

determining an analysis language to analyze the voice data;

dividing and storing the received voice data with reference to a verbal pause; and converting the stored voice data for each interval into text data by analyzing the voice data based on the analysis language.

14. The method of claim 13, wherein the determining of the analysis language comprises deciding the analysis language based on a counterpart's phone number or a public land mobile network (PLMN) identifier (ID) of a network being used for the connected phone call.

15. The method of claim 9, wherein the displaying comprises:

detecting a preconfigured specific word or number in the text data;

configuring a display screen based on the detected specific word or number; and displaying the display screen.

16. The method of claim 9, further comprising:

measuring a time interval until a reception of a user input while an ARS voice is received;

storing the received user input;

determining whether a phone call connection with the counterpart succeeds after the ARS phone call is terminated by analyzing the receive voice data;

re-connecting a phone call with the ARS phone number which has been connected at a regular time interval when the phone call connection with the counterpart fails;

re-inputting the stored user input at the measured time interval; and notifying whether the phone call connection succeeds to the user when the phone call connection with the counterpart succeeds after the ARS phone call is terminated.

* * * * *